(12) United States Patent
Oyama et al.

(10) Patent No.: US 7,191,542 B2
(45) Date of Patent: Mar. 20, 2007

(54) OIL LEVEL GAUGE

(75) Inventors: Kenji Oyama, Kanagawa (JP); Seiji Ootsubo, Kanagawa (JP)

(73) Assignee: Piolax, Inc., Yokohama (JP)

( * ) Notice: Subject to any disclaimer, the term of this patent is extended or adjusted under 35 U.S.C. 154(b) by 10 days.

(21) Appl. No.: 11/115,325

(22) Filed: Apr. 27, 2005

(65) Prior Publication Data
US 2005/0241171 A1 Nov. 3, 2005

(30) Foreign Application Priority Data
Apr. 28, 2004 (JP) .......................... P2004-133398
Mar. 22, 2005 (JP) .......................... P2005-081064

(51) Int. Cl.
*G01F 23/04* (2006.01)

(52) U.S. Cl. .......................................... 33/729; 33/722

(58) Field of Classification Search ........... 33/722–731
See application file for complete search history.

(56) References Cited

U.S. PATENT DOCUMENTS

| 2,333,838 | A | * | 11/1943 | Wilson | 33/729 |
| 2,705,372 | A | * | 4/1955 | Cornell | 33/726 |
| 2,849,796 | A | * | 9/1958 | Eshbaugh | 33/729 |
| 3,488,855 | A | * | 1/1970 | Howe | 33/729 |
| 3,991,476 | A | * | 11/1976 | Haines | 33/731 |
| 4,021,924 | A | * | 5/1977 | Haines | 33/726 |
| 4,558,520 | A | * | 12/1985 | Forde, Jr. | 33/725 |
| 5,094,008 | A | * | 3/1992 | Murphy et al. | 33/723 |
| 5,205,172 | A | * | 4/1993 | Doak | 33/731 |
| 5,241,753 | A | * | 9/1993 | Lalevee, Sr. | 33/726 |
| 2004/0143985 | A1 | * | 7/2004 | Porter et al. | 33/722 |

FOREIGN PATENT DOCUMENTS

JP    8-247822    9/1996

* cited by examiner

*Primary Examiner*—G. Bradley Bennett
(74) *Attorney, Agent, or Firm*—McGinn IP Law Group, PLLC

(57) ABSTRACT

An oil level gauge includes a handle section, a shank section, and a measuring section. The measuring section includes an upper limit mark and a lower limit mark in an up and down direction. The measuring section has a curved shape in a direction perpendicular to a longitudinal direction of the measuring section.

15 Claims, 5 Drawing Sheets

FIG. 1A
FIG. 1B
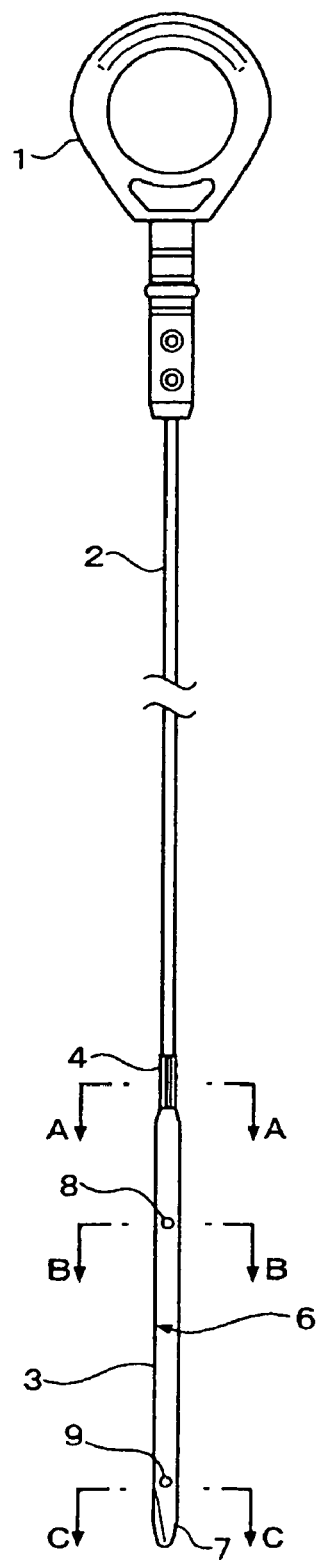
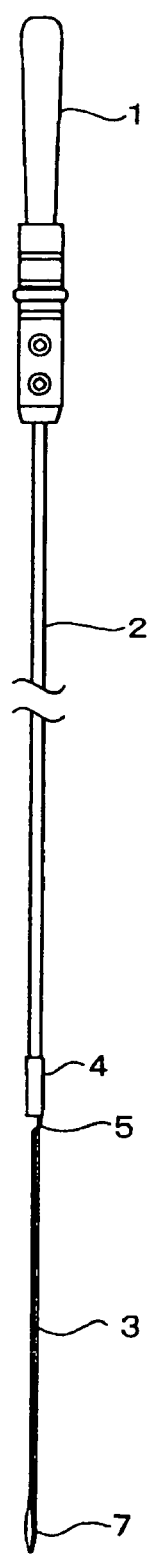

OIL LEVEL GAUGE

BACKGROUND OF THE INVENTION

1. Field of the Invention

The present invention relates to an oil level gauge, which is used for measuring and checking an amount of engine oil of a car engine and an oxidation state of the engine oil.

2. Description of the Related Art

JP-A-Hei.8-247822 discloses an oil level gauge, which is not shown specifically, including three parts, that is, a handle section, a shank section, and a measuring section. In particular, the measuring section having an elongated flat-plate shape is provided with an oil-level upper limit mark and an oil-level lower limit mark, which indicate an appropriate range of an engine oil amount, in the up and down direction thereof.

Generally, the oil level gauge is inserted into a guide pipe communicating with an oil pan of a cylinder block so that only the measuring section of the oil level gauge is immersed in the engine oil within the oil pan. At the time of measuring and checking, the oil level gauge is pulled out of the guide pipe to measure and check the amount and oxidation state of the engine oil within the oil pan by checking the engine oil adhered to the measuring section. From the measuring and checking results, the refill of the engine oil and the replacement period of the engine oil are determined.

SUMMARY OF THE INVENTION

In this way, since the measuring section having a mere flat-plate shape is used as it is, when the oil level gauge according to in JP-A-Hei.8-247822 is pulled out of the bent guide pipe, the engine oil adhered to the measuring section is rubbed by a bent inner circumferential surface of the guide pipe. Therefore, when the amount of engine oil is measured, an original oil-level position becomes obscure, so that the amount of engine oil cannot be checked correctly and precisely.

The invention has been developed in order to effectively solve the problems that the oil level gauge according to the prior art involves. According to a first aspect of the invention, an oil level gauge includes a handle section, a shank section, and a measuring section. The measuring section includes an upper limit mark and a lower limit mark in an up and down direction. The measuring section has a curved shape in a direction perpendicular to a longitudinal direction of the measuring section.

According to this structure, the measuring section has the curved shape in the direction perpendicular to the longitudinal direction of the measuring section. Therefore, even when the oil level gauge is pulled out of a bent guide pipe in order to measure an engine oil amount, the engine oil adhered to the measuring section is hardly rubbed. As a result, an original oil-level position does not become obscure. Therefore, the amount of engine oil can be checked correctly and precisely, unlike the prior art.

According to a second aspect of the invention, in the oil level gauge according to the first aspect, the measuring section has the curved shape between the upper limit mark and the lower limit mark. A front end and a base end of the measuring section have a planar shape without being curved.

If the measuring section is curved over the entire length, the rigidity of the measuring section is likely to increase to reduce flexibility. However, according to the structure described above, except for the range indicating an appropriate amount of engine oil, the measuring section has a planar shape, so that flexibility can be enhanced with rigidity suppressed.

According to a third aspect of the invention, in the oil level gauge according to the first or second aspect, the measuring section includes a C-shaped holding piece that holds a front end of the shank section, at a base end of the measuring section. A portion of the measuring section, which continues from the holding piece is bent so that the measuring section coincides with an extension line of a center line of the shank section.

According to this structure, even when the measuring section of the oil level gauge is immersed obliquely into the engine oil within an oil pan, the measuring section coincides with the extension line of the center line of the shank section. Therefore, a correct amount of the engine oil can be measured regardless of the position of the upper limit mark or the lower limit mark.

According to a fourth aspect of the invention, in the oil level gauge according to any one of the first to third aspects, a front edge of the measuring section is continuously twisted.

According to this structure, the front end of the measuring section is continuously twisted. Therefore, when the oil level gauge is inserted into the guide pipe, the twisted portion comes into sliding contact with the inner circumferential surface of the guide pipe while a contact point therebetween change continuously. Therefore, the oil level gauge can be smoothly inserted into the guide pipe.

According to a fifth aspect of the invention, in the oil level gauge according to any one of the first to fourth aspects, both side edges of the measuring section having a curved shape are bent reversely to a curved direction.

Since the measuring section is curved in the direction perpendicular to the longitudinal direction, warpage may occur in the longitudinal direction due to a residual stress. However, according to the structure described above, since the both side edges of the measuring section are bent reversely to the curved direction, the warpage is effectively prevented from occurring. Therefore, the amount of engine oil can be checked correctly and precisely.

According to one embodiment of the present invention, an oil level gauge includes a handle section, a shank section, and a measuring section. The measuring section has a curved shape in a direction perpendicular to a longitudinal direction of the measuring section. Therefore, even when the oil level gauge is pulled out of a bent pipe guide, the engine oil adhered to the measuring section is prevented from being easily rubbed. As a result, an oil-level position of the engine oil can be measured correctly at all times.

BRIEF DESCRIPTION OF THE DRAWINGS

FIG. 1A is a front view illustrating an oil level gauge according to an embodiment of the invention and FIG. 1B is a side view illustrating the same.

DETAILED DESCRIPTION OF THE PREFERRED EMBODIMENTS

Hereinafter, an embodiment of the invention will be described in detail. Similarly to JP-A-Hei.8-247822, an oil level gauge according to this embodiment also includes three parts, i.e., a handle section 1 made of a synthetic resin, a shank section 2 made of steel wire, and a measuring section 3 made of stainless steel, as shown in FIG. 1. The oil level gauge is used for measuring and checking an amount of engine oil of a car engine and an oxidation state of the engine oil. Specifically, the shank section 2 is formed in a round-rod shape so that it has no directivity when the shank section 2 is inserted into a guide pipe. The shank section 2 and the measuring section 3 are coupled by caulking. Further, the handle section 1 and the shank section 2 are coupled by caulking.

Figure 2A:
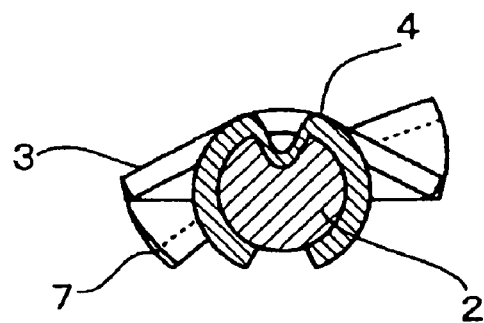
FIG. 2A is a cross-sectional view taken along an A—A line in FIG. 1A.
Figure 2B:
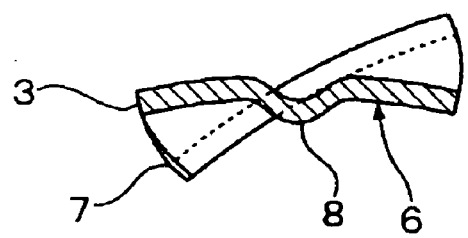
FIG. 2B is a cross-sectional view taken along a B—B line in FIG. 1A.
Figure 2C:
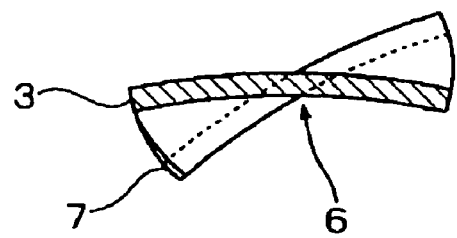
FIG. 2C is a cross-sectional view taken along a C—C line in FIG. 1A.
Figure 3:
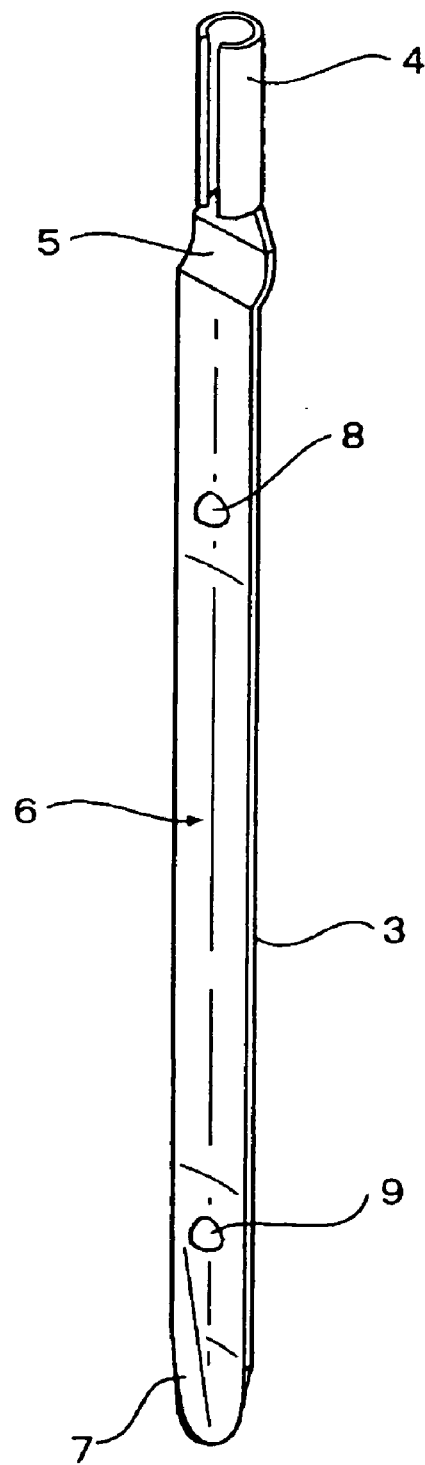
FIG. 3 is a perspective view illustrating only a measuring section.

In addition to the configuration described above, this embodiment has the following features as shown in FIGS. 2 and 3. A C-shaped holding piece 4 for holding a front end of the shank section 2 is integrally provided at a base end of the measuring section 3. Further, a portion 5 continuing from the holding piece 4 is bent so that the measuring section 3 is caused to coincide with an extension line of the center line of the shank section 2. On the other hand, except for the holding piece 4 and the bent portion 5, a portion having a curved shape 6 is provided in the measuring section 3 on purpose in a direction perpendicular to a longitudinal direction of the oil level gauge. Also, a portion having a twisted shape 7 is provided on purpose to continue to a front edge of the measuring section 3.

Figure 4:
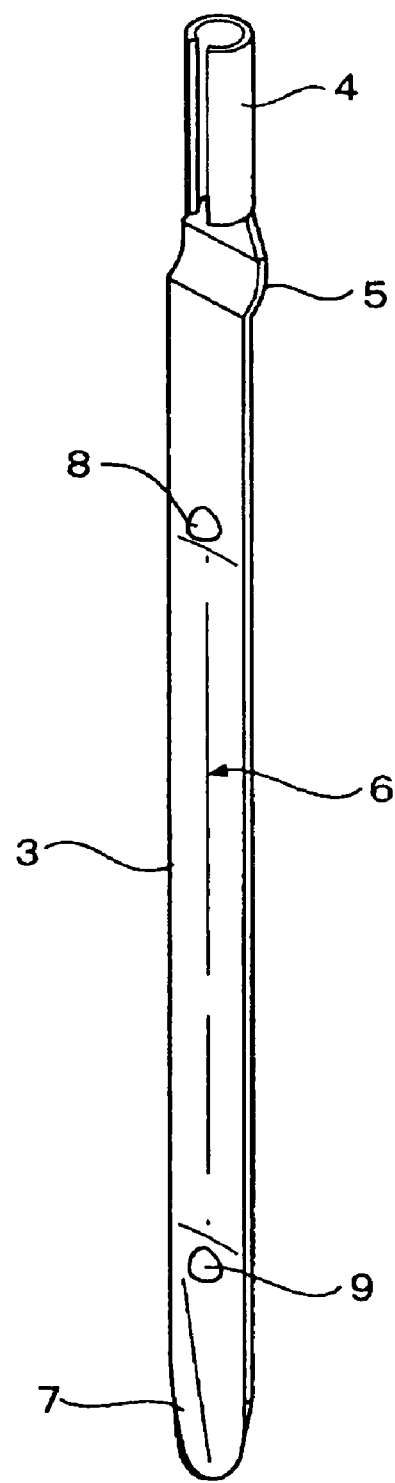
FIG. 4 is a perspective view illustrating another example of the measuring section.

Moreover, although the curved shape 6 is given over the entire length of the measuring section 3 except for the holding piece 4 and the bent portion 5 in this embodiment, it should be understood that the invention is not limited thereto. For example, as shown in FIG. 4, the curved shape 6 may be given in the direction perpendicular to the longitudinal direction of the oil level gauge only between an oil-level upper limit mark 8 and an oil-level lower limit mark 9, which are provided in the up and down direction of the measuring section 3 to indicate an appropriate range of engine oil amount. In this case, the front end and base end of the measuring section 3 may have a planar shape without being curved.

Figure 5:
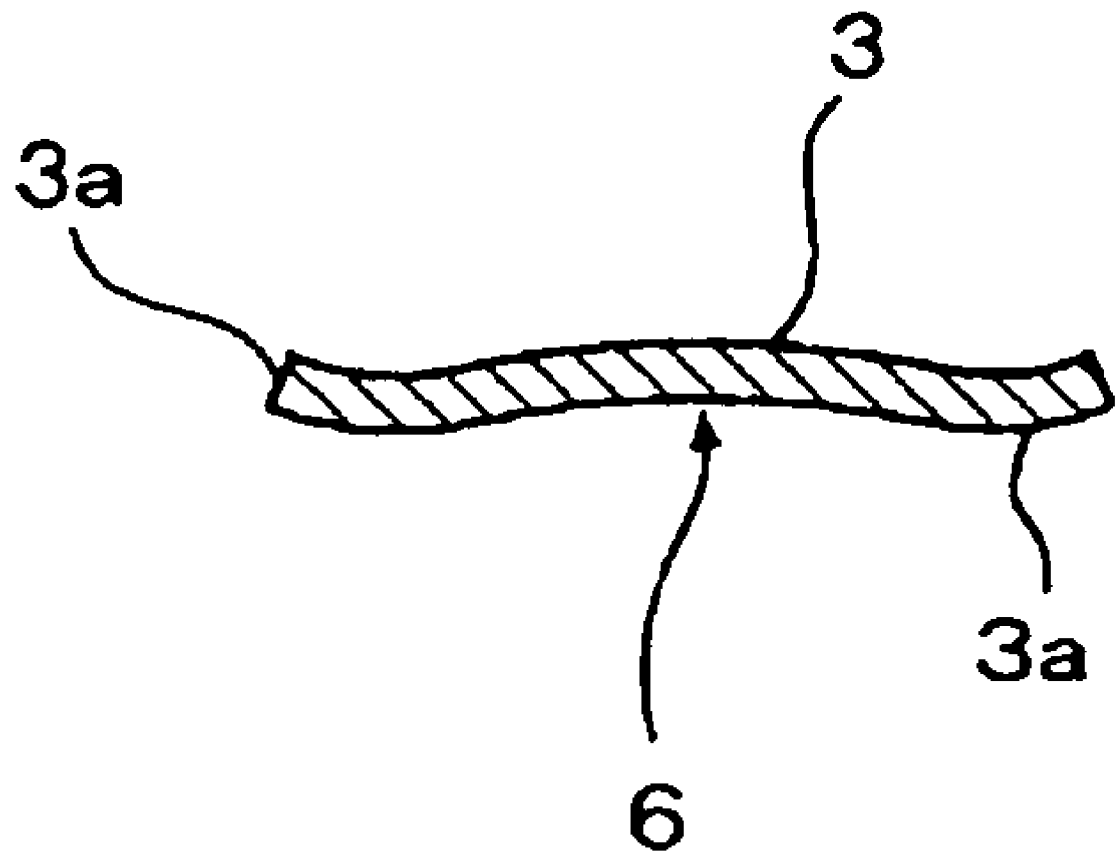
FIG. 5 is an enlarged cross-sectional view of essential parts showing a state where the both side edges of the measuring section are bent reversely to a curved direction.

In addition, since the measuring section 3 is curved in the direction perpendicular to the longitudinal direction in the embodiment, warpage may occur in the longitudinal direction due to a residual stress. However, in this case, both side edges 3a of the measuring section 3 having the curved shape 6 is bent reversely to the curved direction as shown in FIG. 5, to effectively prevent the warpage from occurring. As a result, the amount of engine oil can be checked correctly and precisely.

Accordingly, when the oil level gauge having such a configuration is used, the oil level gauge is inserted into the guide pipe communicating with an oil pan of a cylinder block so that only the measuring section 3 is immersed in engine oil within the oil pan, which is not shown specifically. Therefore, when the oil level gauge is inserted into a guide pipe, the portion having the twisted shape 7 formed in the front edge of the measuring section 3 comes into sliding contact with an inner circumferential surface of the guide pipe while a contact point therebetween is changed sequentially. Therefore, the oil level gauge according to this embodiment can be smoothly inserted into the guide pipe. In addition, at the time of measuring and checking, the oil level gauge is pulled out of the guide pipe to measure and check an amount of the engine oil within the oil pan and an oxidation state of the engine oil by checking the engine oil adhered to the measuring section 3. From the measuring and checking results, refill of the engine oil and/or a replacement period of the engine oil is determined. In this embodiment, the curved shape 6 is given to the measuring section 3 in the direction perpendicular to the longitudinal direction of the measuring section 3 as already described above. Thus, the engine oil adhered to the measuring section 3 is hardly rubbed, even when the oil level gauge is pulled out of a bent guide pipe. Therefore, an original oil-level position does not become obscure. As a result, there is no fear that the amount of the engine oil cannot be checked correctly and precisely as in the prior art.

In the embodiment, the curved shape 6 is given over the entire length except for the holding piece 4 and the bent portion 5 of the measuring section 3. However, if the curved shape 6 is given to the measuring section 3 in the direction perpendicular to the longitudinal direction only between the oil-level upper limit mark 8 and the oil-level lower limit mark 9, which indicate the appropriate range of the engine oil amount as shown in FIG. 4, the minimum object of the invention is sufficiently achieved. If the measuring section 3 is curved over the entire region in the longitudinal direction thereof, the rigidity of the measuring section 3 may increase to reduce flexibility. However, in this modification, since the front end and the base end of the measuring section 3 have the planar shape without being curved, portions except for the range indicating the appropriate amount of engine oil have a planar shape. Thus, flexibility can be enhanced while an increase of rigidity is suppressed.

In addition, even though the measuring section 3 of the oil level gauge is immersed obliquely into the engine oil within the oil pan, the bent portion 5 help to make the measuring section 3 to coincide with the extension line of the center line of the shank section 2, as already described above. Therefore, a correct amount of engine oil can be measured regardless of the position of the oil-level upper limit mark 8 or the oil-level lower limit mark 9.

In the oil level gauge according to the embodiments of the invention, the measuring section is curved in the direction perpendicular to the longitudinal direction. Therefore, even when the oil level gauge is pulled out of a bent guide pipe, the engine oil adhered to the measuring section is not rubbed. As a result, the oil level gauge according to the embodiments of the invention is greatly favorable for measuring the amount of engine oil.

What is claimed is:

1. An oil level gauge comprising:
    a handle section;
    a shank section; and
    a measuring section including an upper limit mark and a lower limit mark in an up and down direction, wherein the measuring section has a curved shape portion in a direction perpendicular to a longitudinal direction of the measuring section, wherein:
    the measuring section includes a C-shaped holding piece that holds a front end of the shank section, at a base end of the measuring section; and
    a portion of the measuring section. which continues from the holding piece is bent so that the measuring section coincides with an extension line of a center line of the shank section.

2. The oil level gauge according to claim 1, wherein:
    the handle section and the shank section are coupled to each other;

the shank section and the measuring section are coupled to each other; and the shank section and the measuring section extend in the longitudinal direction.

3. The oil level gauge according to claim 1, wherein:

the measuring section has the curved shape portion between the upper limit mark and the lower limit mark; and a front end and a base end of the measuring section have a planar shape without being curved.

4. The oil level gauge according to claim 1, wherein a front edge of the measuring section is continuously twisted.

5. The oil level gauge according to claim 1, wherein side edges of the measuring section having the curved shape are bent reversely to a curved direction of the curved shape portion.

6. The oil level gauge according to claim 1, wherein the curved shape portion continues over the entire measuring section.

7. The oil level gauge according to claim 1, wherein the curved shape portion continues between the upper limit mark and the lower limit mark.

8. The oil level gauge according to claim 1, wherein a front end and a base end of the measuring section have a planar shape without being curved.

9. The oil level gauge according to claim 1, wherein the shank section comprises a rod like shape.

10. The oil level gauge according to claim 1, wherein the curved shape portion extends other than over the holding piece.

11. The oil level gauge according to claim 1, further comprising a bent portion disposed between the C-shaped holding piece and the curved shape portion that aligns the shank section with the measuring section.

12. The oil level gauge according to claim 1, further comprising a twisted portion that twists continuously from a tip of the oil level gauge to the curved shape portion.

13. The oil level gauge according to claim 12, wherein the twisted portion extends to the lower limit mark.

14. The oil level gauge according to claim 4, wherein the front edge that is continuously twisted extends to the lower limit mark.

15. A measuring section for an oil level gauge, comprising:

an upper limit mark and a lower limit mark in an up and down direction;

a curved shape portion in a direction perpendicular to a longitudinal direction of the measuring section; and a C-shaped holding piece that holds a front end of a shank section, at a base end of the measuring section, wherein a portion of the measuring section, which continues from the C-shaped holding piece is bent so that the measuring section coincides with an extension line of a center line of the shank section.

* * * * *